United States Patent [19]

Anderson et al.

[11] 3,897,319
[45] July 29, 1975

[54] RECOVERY AND RECYCLE PROCESS FOR ANODIC OXIDATION OF BENZENE TO QUINONE

[75] Inventors: Fred J. Anderson, LaSalle; Jack L. Kessler, Ottawa, both of Ill.

[73] Assignee: Carus Corporation, LaSalle, Ill.

[22] Filed: Aug. 6, 1973

[21] Appl. No.: 385,987

Related U.S. Application Data

[63] Continuation-in-part of Ser. Nos. 139,651, May 3, 1971, Pat. No. 3,758,392, and Ser. No. 203,804, Dec. 1, 1971, Pat. No. 3,758,391.

[52] U.S. Cl. ............................... 204/78; 260/396 R
[51] Int. Cl. ..................... C07b 29/06; C07c 49/64
[58] Field of Search .................... 204/78; 260/396 R

[56] References Cited
UNITED STATES PATENTS

| | | | |
|---|---|---|---|
| 1,318,631 | 10/1919 | Weiss | 260/396 R |
| 1,987,148 | 1/1935 | Kleimenhagen | 260/396 R |
| 2,130,151 | 9/1938 | Palfreeman et al. | 204/78 |
| 2,135,368 | 11/1938 | Vagenius et al. | 204/78 |
| 3,758,391 | 9/1973 | Anderson et al. | 204/78 |
| 3,758,392 | 9/1973 | Anderson et al. | 204/78 |

*Primary Examiner*—F. C. Edmundson

[57] ABSTRACT

In a combination recovery and recycle process for the anodic oxidation of benzene to quinone in electrolysis cells, recycle benzene of low quinone content is provided by contacting the cell-converted benzene with a water solution of hydroquinone, the quinone extracting into the water solution and forming precipitated quinhydrone, which is recovered therefrom. The spent hydroquinone water solution is separated from the residual benzene, which is recycled to the electrolysis system. This combination process favors efficient conversion of benzene to quinone by keeping the quinone content of the benzene supplied to the electrolysis cells at a low value, and the recycling of soluble impurities in the benzene improves the purity of the quinhydrone. The product is readily convertible into quinone or hydroquinone, or it may be stored until such conversion is desired.

7 Claims, 2 Drawing Figures

RECOVERY AND RECYCLE PROCESS FOR ANODIC OXIDATION OF BENZENE TO QUINONE

CROSS-REFERENCE

This application is a continuation-in-part of our copending application Ser. No. 139,651, filed May 3, 1971, now U.S. Pat. No. 3,758,392 and of our copending application Ser. No. 203,804, filed Dec. 1, 1971, now U.S. Pat. No. 3,758,391.

BACKGROUND

Quinone (p-benzoquinone) is a known intermediate for the chemical synthesis of hydroquinone (1, 4-dihydroxy benzene). Therefore the economic importance of quinone is based on the fact that hydroquinone is an organic chemical of major commercial importance with an estimated present annular production in the United States of 15 million pounds or more. Hydroquinone is an indispensible major ingredient in photographic developers, serves as an intermediate for many organic chemicals and dyestuffs, and is also used as an antioxidant (viz. in rubber tires), as an anti-skinning additive in paints, and as a polymerization inhibitor in the handling of monomers. Moreover, it has long been recognized that hydroquinone, with its molecular symmetry and bi-functionality, is an excellent building block in the synthesis of polymers (e.g. ployesters), especially those with high temperature resistance and other desirable properties. Since the Second World War, a large number of patents have issued pertaining to this subject, but, nevertheless, no commercial plastic incorporating hydroquinone has appeared on the market. Although such plastics have highly desirable properties, the price of hydroquinone has remained prohibitively high for such applications. It has therefore been apparent for many years that if the price of hydroquinone could be substantially reduced, the commercial utilization of hydroquinonebased plastics could be expected to develop at a rapid pace.

At present, the most widely used commercial method of making hydroquinone is based on the oxidation of aniline (with $MnO_2$ in sulphuric acid) to quinone with subsequent chemical reduction of the quinone to hydroquinone. The economics of this process are such that significant reductions in prices are unlikely. Economic limitations include high raw material and labor costs. There has therefore been an active search for alternate processes based on lower priced raw materials, and/or involving other savings in production and manufacturing costs.

There is also a potentially large market for quinone itself, if it could be produced at a lower price than at present. Surprisingly, although quinone is an intermediate in the synthesis of hydroquinone (as indicated above), the commercial price of quinone is substantially higher than that of hydroquinone. Because of the nature of the aniline process for producing hydroquinone, it is not economical to isolate the quinone intermediate. Most of the quinone on the market today is manufactured by re-oxidizing hydroquinone, which explains why quinone sells for nearly twice as much per pound as hydroquinone.

Since quinone is one of the most reactive organic chemicals, it is a potentially important starting material for a great many syntheses. Consequently, the search for lower cost processes of producing hydroquinone has also involved consideration of processes whereby the intermediate quinone can be recovered and offered as a commercial product in its own right.

PRIOR ART

For well over fifty years, it has been known that benzene can be electrolytically oxidized to p-benzoquinone. Further, this anodic oxidation of benzene has been extensively studied, both theoretically, and with the hope of practical application. (See, for example, Seyewetz and Miodon, Bul. Soc. Chim. France (4), 33 (1923), 449–456; and Udupa et al, Bul. Acad. Polonaise Sciences, IX, No. 2 (1961) pp. 45–50; and other references cited therein.) The operation of such electrolysis cells involves the evolution of oxygen at the anode and hydrogen at the cathode, which are potentially explosive when mixed. Most prior workers have therefore employed cells with the anode and cathode compartments separted by a diaphragm of porous material, the porosity of the diaphragm permitting ion transfer of electric current between the electrolyte component of the anolyte to the catholyte electrolyte. Batch-type cells were used in most of the reported experiments, but continuous or flow-through type cells have been proposed. (See German Patent specifications Nos. 1,102,171 and 1,101,436, published March, 1961.)

However, the published results have not been encouraging for commercial application. As far as is known, until the present invention, no benzene oxidation process has been developed beyond the laboratory stage. Despite the fact that benzene is a low priced starting material for production of quinone, (for example, as compared to aniline), the art seems to have accepted the view that processes based on the starting material have inherent limitations which preclude practical commercial utilization. In carrying forward and re-evaluating the work of Seyewetz and Miodon (cited above), Udupa et al. reached the discouraging conclusion "that the oxidation proceeds well for short durations of electrolysis only and continuation of electrolysis decreases quinone formations." (Udupa et al., cited above, p. 50 (1961.) Little if any progress is shown by the more recent literature.

U.S. Pat. No. 2,130,151, issued in 1938 proposes a commercial process based on the use of an open electrolysis cell (without a diaphragm) for the conversion of benzene to quinone at the anode, transfer internally of the quinone to the cathode, and cathodic reduction of quinone to hydroquinone. No commercialization is known. If carried out as described, the mixing within the electrolysis cells of the anodic oxygen with the cathodic hydrogen would appear to create a serious explosion hazard. Further, although not indicated in the patent, it may be assumed that the production of quinone and hydroquinone within an open cell will lead to their reaction, forming insoluble quinhydrone within the cell, which could cause other operational problems. The patent does mention that the anode electrolyte becomes fouled with dissolved oxidation products requiring it to be discarded, and that insoluble matter is formed in the cells requiring shutdowns for cleaning.

German Pat. No. 614,041 also describes an open cell apparatus and process for conversion of benzene to quinone. An inclined anode is suspended above the cathode, and the benzene is introduced beneath the anode plate as a fine droplet dispersion, flowing upwardly along the underside of the plate, and collecting on top of the aqueous phase for recycle. The process and apparatus is claimed to avoid the formation of contaminating solids, but, otherwise, all of the disadvantages described above with reference to U.S. Pat. No. 2,130,151 would be anticipated. No commercialization is known.

United States Pat. Nos. 1,322,580 and 2,285,858 describe processes for the conversion of benzene to quinone in electrolytic cells equipped with porous diaphragms. Patent 1,322,580 discloses the use of a current density of 0.5 amperes per square decimeter in conjunction with cell oxidation temperatures below 12° C. No reference is made to the formation of solid contaminants, but it is apparent that the low current density and the amount of cooling required to maintain cell temperatures below 12° C. constitute conditions which are not economically feasible for commercial production of quinone. Patent 2,285,858 discloses the use of higher temperatures (e.g. 25°–30° C.) in conjunction with a current density of 2.4 amps/dm$^2$. However, it is pointed out that under these conditions the acid electrolyte becomes fouled with oxidation products of benzene which require the electrolyte to be discarded. Neither of these processes is known to have been used commercially.

While it is known that quinone reacts with hydroquinone to form insoluble quinhydrone, as far as applicants are aware, this precipitation reaction has not been previously used to recover quinone from cell-converted benzene. Further, it has not been recognized that recycle of the benzene from a quinhydrone precipitation can provide important process advantages.

RELATED APPLICATIONS

Prior co-pending applications Ser. Nos. 139,651 and 203,804, as cited above, describe continuous recycle processes for electrolytic conversion of benzene to quinone. They also in general disclose the possibility of a quinone recovery operation in which the quinone is precipitated from the cell-converted benzene by reaction with hydroquinone. An important advantage of such a system is pointed out; namely, that the concentration of the quinone in the recycle benzene thus obtained can be kept very low. This application has therefore been designated a continuation-in-part of the cited co-pending applications.

Summary

The present invention is a combination recovery and recycle process for the anodic oxidation of benzene to quinone with recycle of benzene after partial removal of quinone therefrom by quinhydrone precipitation. More specifically, the cell-converted benzene phase of increased quinone content (e.g. 1–15g./l.) is contacted with a water solution of hydroquinone. The quinone is extracted from the benzene phase into the water solution in which it reacts with the hydroquinone to form precipitated quinhydrone with corresponding reductions in the concentration of quinone in the benzene phase and hydroquinone in the water solution. Nearly all of the soluble impurities remain in solution. The precipitated quinhydrone is recovered by a suitable solid separating operation, such as filtration or centrifugation, and may be washed for further purification. The spent hydroqinone water solution is separated from the residual benzene phase, which is recycled to the electrolysis cells of the continuous conversion system. The recycled benzene may advantageously have a quinone content of substantially less than 5 grams per liter, such as below 1 gram per liter.

DRAWING

In the following description, references will be made to the drawing, wherein

FIG. 1 is a schematic flow diagram illustrating a continuous recycle process for the anodic oxidation of benzene to quinone in combination with a quinone removal system providing recycle benzene of reduced quinone content; and FIG. 2 is a schematic flow diagram showing the quinone recovery system which utilizes a quinhydrone reactor for the precipitation of quinone as quinhydrone on contacting with hydroquinone.

DETAILED DESCRIPTION

Figure 1:
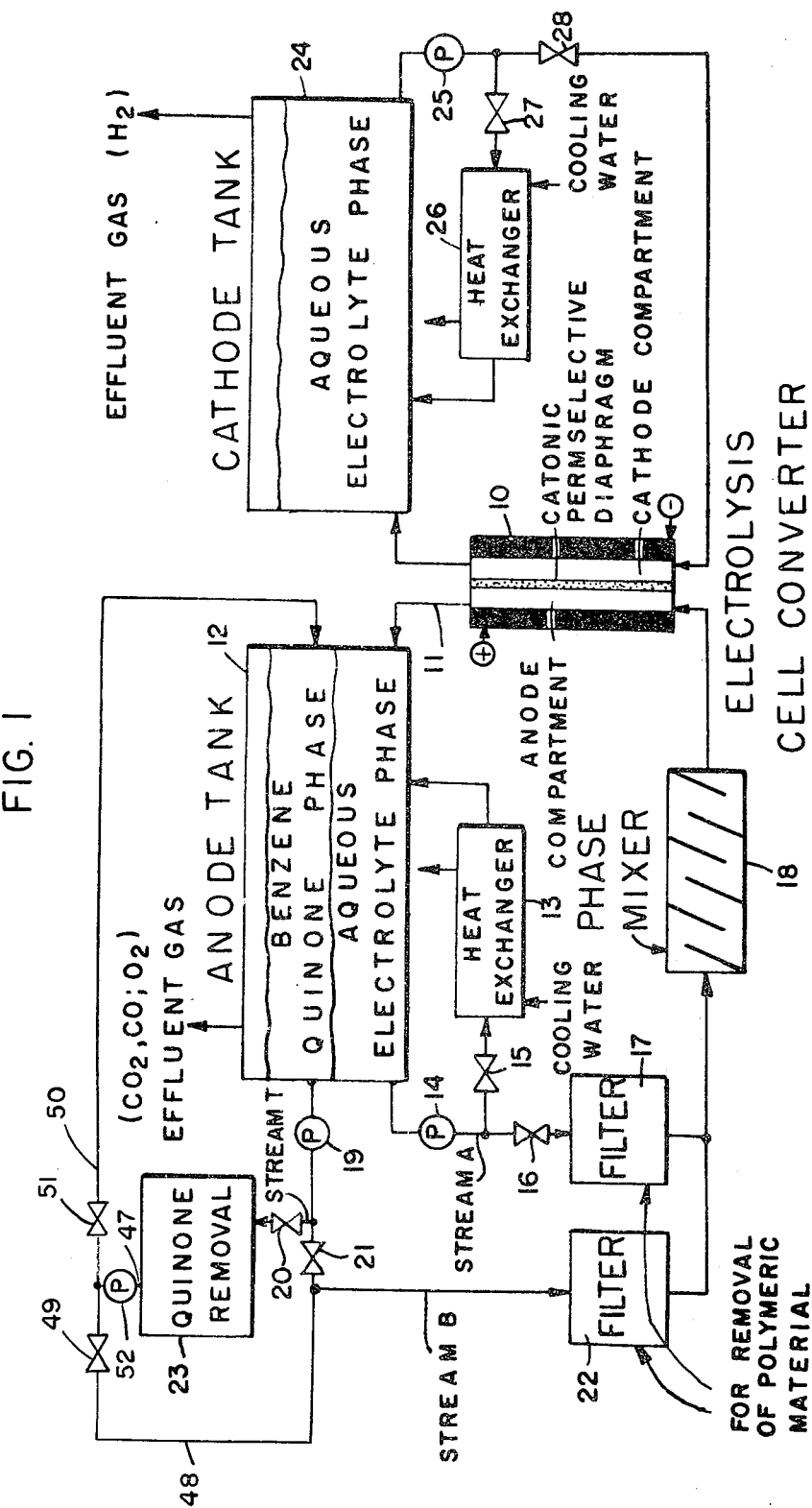

In the continuous recycle process for conversion of benzene to quinone by anode oxidation in an electrolysis cell, as described in the above cited applications, the method of operation comprises continuously withdrawing from the cell an anolyte mixture which includes a quinone-containing benzene phase, and an aqueous electrolyte phase. Polymeric solid material is separated from the liquid phases. Portions of the clarified aqueous electrolyte are recycled through the electrolysis cell, and there is mixed therewith portions of benzene substantially free of the polymeric material, and of lower quinone content than that of the withdrawn benzene phase. For continuous operation, at least part of the quinone-containing phase is transferred to a quinone recovery operation, as will subsequently be described in detail. Benzene, with the major portion of the quinone removed, is returned to the conversion process for admixture with the solids-free electrolyte being supplied to the cell. This may comprise the entire source of benzene for the cell (except for additions of fresh makeup benzene), or a portion of the quinone-containing benzene can be clarified to remove solids, and mixed with the solids free electrolyte together with benzene of reduced quinone content, thereby producing a benzene phase of substantially lower quinone content than the benzene phase removed from the cell.

In practicing the method of the invention, a current-transmitting diaphragm is preferably employed to separate the anode and cathode compartments of the electrolysis cells. This diaphragm can be a permeselective cationic exchange membrane or a porous diaphragm.

In practicing the process, the benzene to be subjected to anode oxidation is formed into a dispersion with an aqueous electrolyte, the resulting dispersion comprising the anolyte. A separate aqueous electrolyte, comprising the catholyte, continuously flows through the cathode compartment. For example, both electrolyte phases of the anolyte and the catholyte may be an aqueous acid electrolyte, and both may comprise the same acid electrolyte. From the anode compartments of the cell means, which may comprise a plurality of pairs of anode and cathode compartments arranged for parallel or series flow, there is continuously removed a four-phase mixture comprising a quinone-containing benzene phase, an aqueous electrolyte phase, a gaseous phase, and a solids phase. The gaseous phase will usually comprise a mixture of carbon dioxide and oxygen with some carbon monoxide. The solids phase is a polymeric, slimy by-product formed by the reaction. The phases are separated from each other after removal, and portions of the quinonecontaining phase, with added benzene of lesser quinone content, and the aqueous acid electrolyte phase, all substantially free of gas and insolubles can be mixed to form a dispersion of recycle anolyte.

The diaphragms separating the cells into separate anode and cathode compartments can consist of non-porous cation exchange membranes. Where the electrolyte component of the anolyte is an aqueous acid, as preferred, the ion exchange membrane should be capable of transmitting hydrogen ions (H+). Where the catholyte contains quinone for reduction at the cathodes to hydroquinone, non-porous diaphragms are desirable. As previously described, however, the catholyte can consist of an aqueous electrolyte substantially free of quinone.

Porous diaphragms can also be employed because of the features of the process which minimize the circulating load of solid contaminants. Woven filter cloths are suitable, but other kinds of porous diaphragms can also be used.

Referring now to the accompanying flow diagram designated as FIG. 1, there is shown a simplified cross-section of one cell of an electrolysis cell converter 10, which will usually include multiple cells arranged for parallel flow but in series electrically, as bipolar multiple cells of a battery. The cells can be built up sandwich fashion with each plate (except for the end plate) having an anode compartment on one side and a cathode compartment on the other, using a bipolar electrical hookup. As shown for one cell, the anode and cathode compartments are separated in sealed-apart relation by a permselective diaphragm therebetween. However, if porous diaphragms are used, such diaphragms in sheet or plate form, can be positioned in the same way. For example, glass fiber filtration mats can be employed as porous diaphragms.

Returning to the description of FIG. 1, the anode compartment of cell 10 is shown discharging into a pipe line 11 connected to an elongated tank 12. Tank 12 serves as a storage tank for the liquid phases, and also as a gas-liquid and liquid-liquid separator. The gas phase, which will usually be primarily a mixture of carbon dioxide, carbon monoxide, and oxygen, collects at the top of the tank from which it can be removed as an effluent. If desired, the effluent gas can be passed through a condenser or liquid trap to remove vaporized or entrained benzene. In tank 12, the liquid phases are allowed to separate by settling, so that the benzene phase containing the dissolved quinone collects above the higher specific gravity aqueous electrolyte, such as dilute aqueous sulphuric acid.

In the embodiment shown, the polymeric and any other insolubles produced within the anode compartments of the cell are transferred with the liquid and gas phases to the tank 12. The solids tend to follow the benzene phases, but will also be present in the aqueous phase. Both the quinonecontaining benzene phase, as separated in tank 12, and the aqueous phase will therefore be contaminated with the slimy insolubles. Some of this material may collect at the interface between the benzene and aqueous phases. If desired, the coalescence of the polymeric solids and their collection at the interface can be promoted by adding surface active agents to make the insolubles less readily wet by the benzene, or to promote separation from the aqueous phase.

Portions of the acid electrolyte phase, which collects in the lower portion of tank 12 can be continuously cycled through a heat exchanger 13 by means of pump 14 for temperature control by cooling, the amount being controlled by valve 15. Pump 14 also passes portions of the aqueous phase, composing Stream A, through filter 17 to phase mixer 18. Filter 17 removes the polymeric materials and any other solids, so that Stream A, as supplied to mixer 18 is substantially free of solids. The filter can be alternatively located in the cooling circuit for the aqueous electrolyte phase. Make-up water (not shown) can be added to Stream A, as required to balance the water broken down in converter 10.

The benzene phase, containing the dissolved quinone, and other soluble products of the electrolysis, is withdrawn from tank 12 at an elevation above the benzene-water interface by means of pump 19. Unless the slimy solid material has been substantially completely removed from the benzene phase by settling or by some other procedure associated with tank 12, any portions of the benzene-containing phase returned directly to converter 10 are passed through a filter 22. Other portions of the quinone loaded benzene from tank 12 can be passed by pump 19 to a quinone removal operation, as indicated generally at 23. The relative proportions of Stream B, the direct recycle stream, and Stream T, the stream transferred to quinone removal, are controlled by valves 20 and 21. Stream B is filtered at 22 to remove any polymeric material or other solids so that the benzene phase returned to converter 10 is substantially solids free. Stream T may also be filtered as it is transferred to the quinone recovery plant, or a solids separation may be included in that operation.

The quinone recovery operation, designated generally by the number 23 in FIG. 1, will subsequently be described in detail in relation to the flow sheet of FIG. 2. However, FIG. 1 illustrates how a quinone recovery by quinhydrone precipitation may be integrated with the cell conversion recycle. The arrangement shown provides for considerable flexibility in controlling the stream flows to and from the recovery operation.

The recycle benzene is shown being discharged from the quinone removal plant 23 through a pipe line 47, provides connections, respectively, through valve 51 to line 50 and through valve 49 to line 48. Line 50 connects to anode tank 12, thereby permitting part or all of the recycle benzene to be mixed with the benzene phase in tank 12. If all of the recycle benzene is returned to the anode tank 12, this has the disadvantage of unduly diluting the quinone concentration of the benzene phase in tank 12. The quinone concentration of the benzene phase as discharged from cell 10 is substantially higher than that of the recycle benzene after quinone removal. It is preferred to recover quinone from the benzene at as high a concentration as possible, approaching that of the quinone concentration of the benzene as discharged from cell 10.

As shown in FIG. 1, therefore, line 48 connects directly to Stream B, the cell recycle stream. Further, if desired, line 48 can by-pass filter 22, and connect directly with the input line to mixer 18.

With the arrangement shown in FIG. 1, valves 21, 49, and 51 can be adjusted to achieve any desired proportions in the stream flows. For example, valve 21 may be closed, so that all of the benzene phase removed from anode tank 12 is transferred to the quinone removal at 23. In this system of operation, valve 51 may be closed and valve 49 open, so that all of the benzene after quinone removal is recycled as Stream B.

To provide for adequate pump pressure, a pump 52 may be provided in line 47, the discharge from the pump being supplied to either lines 50 or 48, or both. For balance continuous operation, valves 21 and 51 may be partially open, and valve 49 controlled so that the larger proportion of Stream B will be provided by direct recycle from the quinone removal plant through line 48.

The recycled benzene (Stream B) and the aqueous electrolyte phase (Stream A) under pump pressure combine in the feed end of the phase mixer and disperser 18, and after becoming intimately mixed and dispersed therein, the resulting recycle anolyte is passed to the anode compartment (or compartments) of converter 10. For the system shown, the phase ratio of the anolyte can be expressed as the volume of Stream A divided by the volume of Stream B. The transfer ratio is the volume of Stream T divided by the volume of Stream B. It will be understood that additional control valves, flow meters, and control equipment can be provided to permit the phase ratio, the transfer ratio, and the composition of Stream B to be selectively varied and maintained at predetermined values.

Stream T through valve 20 transfers the withdrawn benzene phase to a quinone removal operation for separation of the quinone, and recovery of the benzene for further use in the electrolysis process. The specific recovery procedure is an essential part of the present invention, and, therefore, illustrated in the flowsheet of FIG. 2, which will subsequentially be described. The returned benzene will still contain some quinone, but the amount will be substantially less than that of the benzene phase from converter 10. Fresh or make-up benzene, not previously used in the process can be added to Stream B as required.

The aqueous electrolyte, comprising the catholyte, from the cathode compartments of the converter 10 is transferred to an elongated tank 24, which serves as a storage tank and a liquid-gas separator. As shown, the electrolyte (viz. dilute aqueous sulphuric acid) separates from the gaseous products of the cathode electrolysis, which principally comprises hydrogen gas. The hydrogen can be removed from the top of tank 24 as an effluent gas. The aqueous electrolyte is withdrawn from the lower portion of tank 24 by means of a pump 25 for continuous circulation through a heat exchanger 26 for cooling the catholyte as required. Pump 25 also supplies the catholyte to converter 10, the flow in the cooling and cell circuits being respectively controlled by valves 27 and 28. Make-up electrolyte solution can be added when required to tank 24 or elsewhere in the circuit.

In a modification of the anolyte recycle circuit of FIG. 1, all of the clarified benzene phase can be transferred to the quinone removal plant at 23. After removal of at least the major portion of the quinone, the benzene of substantially reduced quinone content may be transferred by means of a pump to mixer 18. Consequently, the returned benzene, comprising Stream B merges with the recycled aqueous phase, comprising Stream A in the feed line to mixer 18. The phase ratio of the anolyte will therefore be the volume of Stream A divided by the volume of Stream B. The transfer ratio is 100 percent, Stream T comprising all of the benzene phase from the converter. This arrangement has the advantage of minimizing the recycling of quinone formed in a previous pass through the converter.

Where the quinone removal operation involves a precipitation, such as by reacting hydroquinone with the quinone from the benzene to form precipitated quinhydrone, the concentration of the quinone in the recycled benzene (Stream B) can be kept below 1 gram per liter, whereas the concentration of the quinone in the benzene phase after passage through the converter, will usually be at least double that amount, that is, 2 grams or more quinone per liter of benzene. To obtain this much or greater increase in quinone concentration in a single pass through the converter, the length of the flow passage through the individual cells can be increased, or the individual cells can be arranged. for series flow. However, one of the important advantages of the quinhydrone recovery process of this invention is that the cell-converted benzene phase may contain a very low concentration of quinone, such as 1 to 5 grams per liter, while still being suitable for quinone recovery.

The electrolysis cells can advantageously by operated at temperatures above 20° C. This means that the recycle anolyte phases, and preferably also the recycle catholyte liquid, is maintained at a temperature above 20° C. by the controlled removal of heat through heat exchangers, such as heat exchanger 13 in the anolyte circuit and/or heat exchanger 26 in the catholyte circuit. Usually, it will be preferable to maintain the temperatures of the anolyte and catholyte within the cells below 45° C. An advantageous operating range for the cells with respect to the liquid phases therein, both anolyte and catholyte, ranges from about 25° to 40° C.

It is also advantageous to operate the conversion cells with cell current densities above 5 amps/dm². For example, current densities of 7 to 20 amps/dm² can be used advantageously. The practical upper limit on the current density has not been determined, but it appears that current densities up to 30 or higher amps/dm² may be feasible.

The anode effluent gas can be controlled so that it is composed mainly of carbon oxidation products ($CO_2$, $CO$) together with a minor proportion of oxygen. For example, the oxygen content on a gas volume basis can be kept below 25 percent, and it may be advantageous to maintain it below 10 percent. This way, additional by-product contaminants are continuously removed from the anolyte, the contaminants being continuously oxidized to carbon dioxide or carbon monoxide.

The anodes and cathodes can be formed from lead sheets or plates. The active surfaces of the anodes will be converted to lead dioxide ($PbO_2$) during the benzene oxidation, and will then provide a stable and active anode. Lead dioxide oxidizing surfaces can also be provided by anodes formed of lead alloys, or conductive anodes coated with lead or lead alloys. Platinum electrodes or other conductive metal or metal alloys can also be used. The cathode is essentially inactive, and the surface in contact with the catholyte will usually not be modified by the electrolysis. Lead, platinum, and other conductive metals and metal alloys can be used.

A sandwich cell construction which may be used is described in greater detail in copending application Ser. No. 203,804 filed Dec. 1, 1971. The diaphragms can be permselective ion exchanger membranes permitting the transfer of cations, such as the cation exchange membranes disclosed in U.S. Pat. No. 3,193,480, in col. 6. (See also U.S. Reissue Pat. No. 2,865.) Suitable cation-transfer membranes are sold by Ionics Incorporated, Watertown, Massachusetts, for example, IONICS Cation Exchange Membrane No. 61AZG067. Alternatively, the diaphragms can be formed of filter cloth, such as filter cloths woven from sythetic resin fibers (viz. polyester fibers).

Other operating conditions can be as follows:

The anode and cathode electrolyte can be aqueous sulfuric acid ($H_2SO_4$) having a concentration of at least 5 percent, and preferably at least 10 percent w/w. Concentrations of 10 to 25 percent w/w are suitable. Other organic or inorganic acids, such as phosphoric acid ($H_3PO_4$) can be used. Phosphoric acid is a good electrolyte while being somewhat less corrosive for metals than sulfuric acid. In the anolyte, the volume ratio of benzene to aqueous phase can range from 0.01 to 1.0 parts benzene phase per part aqueous phase. For continuous operation, the quinone concentration in the anolyte as discharged from the cell can range from 0.5 to 80 grams quinone per liter of benzene. The linear velocity of the benzene-electrolyte dispersion (the anolyte) through the anode compartment should be at least 0.1 and preferably at least 0.3 feet per second. The upper limit of linear velocity is not critical, but a typical operating range is 0.5 to 2 ft./sec.

Quinhydrone Recovery System

Figure 2:
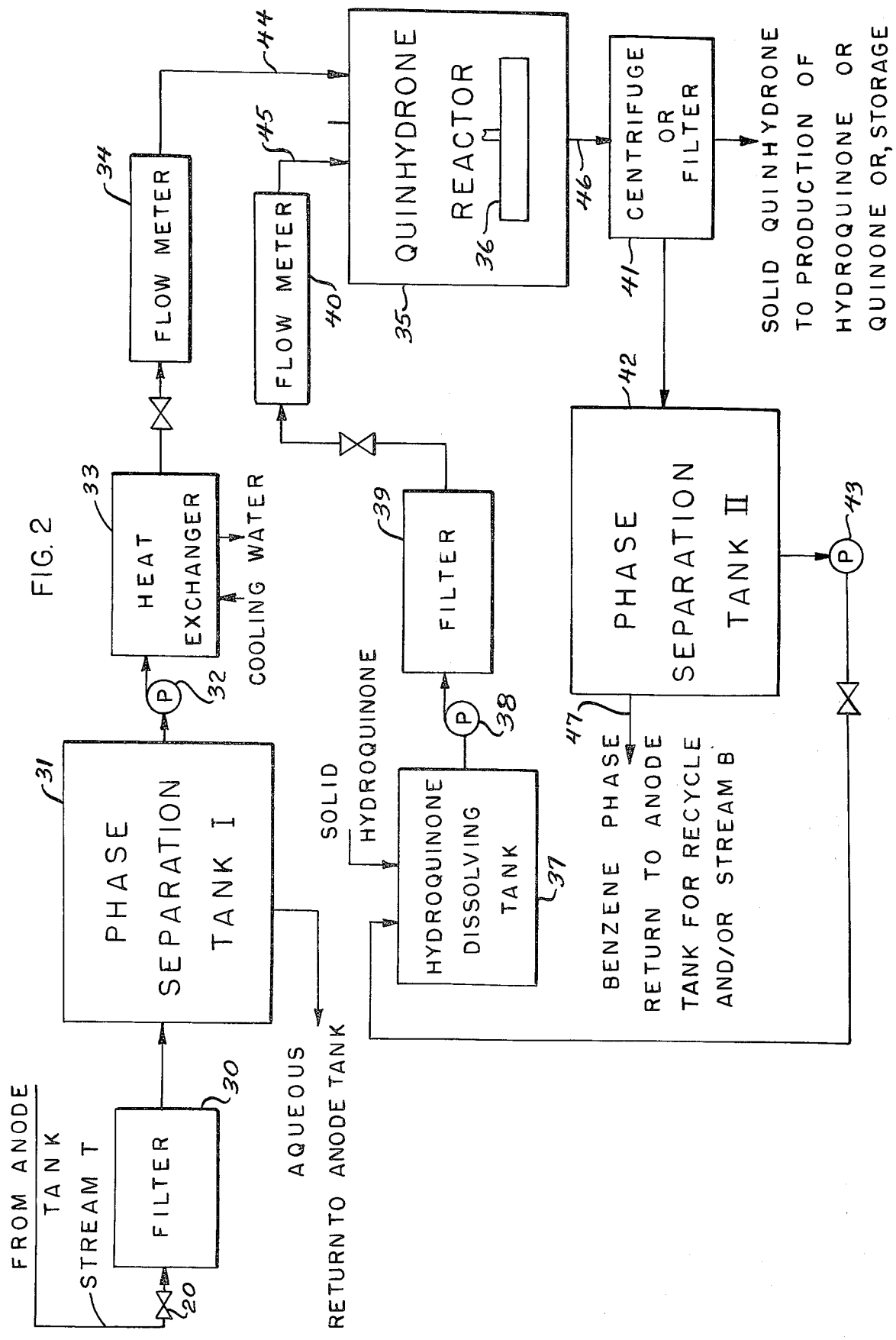

The cell-converted benzene phase of increased quinone content, referred to in FIGS. 1 and 2 as Stream T, may be transferred to quinone removal at quinone concentrations of 0.5 to 50 grams quinone per liter of benzene (g/l). Preferably, the concentration of the benzene transferred to quinone recovery is at least one g/l. Usually concentrations above 15 g/l will not be advantageous. On the basis of present information, it is believed that the most desirable range for quinone recovery is from 1 to 5 g/l. The quinone-containing benzene is contacted with a water solution of hydroquinone. The initial concentration of hydroquinone in the water solution may range from 2 g/l up to saturation at the temperature employed, but usually it will be advantageous to use a concentration of at least 15 grams hydroquinone per liter of aqueous solution. The contacting may be carried out at temperatures in the range of 6° to 40°C. A preferred temperature range for the contacting is from 10° to 25°C. In one embodiment, where the contacting temperature is normally maintained somewhat below the ambient atmospheric temperature, the contacting temperature may advantageously range from 15° to 20°C.

In the contacting operation, some of the quinone transfers to the water phase where it reacts with hydroquinone to form quinhydrone, which precipitates being highly insoluble in both benzene and water. As the quinhydrone forms in the water phase and precipitates out as a solid, the transfer of quinone from the benzene to the aqueous phase continues. The equilibrium relationship is such that the higher the initial hydroquinone concentration in the aqueous phase, the lower will be the final quinone concentration in the benzene phase, that is, the transfer of quinone to the aqueous phase with subsequent formation of insoluble quinhydrone is favored by increasing concentrations of hydroquinone in the aqueous phase. This relationship makes possible the removal of quinone from the benzene phase down to very low concentrations of residual quinone in the benzene. In operating the combination recovery and recycle process, therefore, recycle benzene produced by the quinhydrone reaction can easily have a residual quinone concentration of below five grams quinone per liter of benzene. In the preferred mode of operation, the residual quinone concentration is kept below 1 g/l. For example, a concentration in the range of 0.3 to 0.9 g/l. This makes possible the recycle of benzene to the electrolysis cells at quinone concentrations low enough to be very favorable to the conversion of benzene to quinone at nearly optimum current and chemical yields. In terms of the desired quinone product, it is known that the electrical yield decreases as the quinone concentration in the benzene feed to the electrolysis cells increases. In a recycle system, of course, it is not practical to supply the cells only with fresh benzene, or with recycle benzene from which 100 percent of the quinone has been removed. However, with the system of this invention, the quinone concentration of the recycled benzene can be kept very low; namely, below 5 g/l and preferably below 1 g/l, which approaches the current efficiency of fresh benzene.

Another advantage of the combined recovery and recycle process of this invention is that a very high purity product can be obtained.

In the electrolysis of benzene to quinone, unwanted soluble by-products are formed. (See Fichter, J. Soc. Chem. Ind., Vol. 48, 325–329 Transactions, Nov. 1, 1929). In the anodic oxidation of benzene, phenol is formed first, which converts to both the ortho and para dihydroxybenzene. The ortho product, known as pyrocatechol, constitutes an unwanted benzene soluble impurity. Only the para product, known as quinol, converts to the desired quinone. It can therefore be expected that the pyrocatechol will be present in the benzene processed for quinone recovery. With the recovery and recycle process of the present invention, however, the soluble unwanted by-products, such as pyrocatechol, can remain in the solution and by recycled to the electrolysis cells. Further, by operating the cells as described in prior co-pending application Ser. No. 203,804, part of the oxygen produced at the anodes of the cells is utilized to burn-out the unwanted soluble by-products, such as the pyrocatechol, controlling the build-up of such soluble by-products.

In connection with the present invention, it is therefore important that the soluble by-products in the benzene, such as pyrocatechol, do not react with hydroquinone. Therefore, when the quinhydrone precipitates, it leaves behind in solution such soluble by-products and impurities, except for a small amount that may adhere to or be trapped within the mass of the quinhydrone precipitate. More over, the quinhydrone precipitate may be washed to further reduce impurities. For example, after separation of the quinhydrone precipitate by filtration, the quinhydrone may be washed on the filter with water, preferably cold water. Further, if needed to remove small amounts of benzene-soluble impurities, the separated quinhydrone can be washed with fresh benzene, which may then be used as make-up benzene for the benzene recycle to the electrolysis cells.

After recovery and washing, the quinhydrone can be readily converted to quinone or hydroquinone. Many methods of oxidation are known for converting quinhydrone to quinone. Similarly, methods are well known for reducing quinhydrone to hydroquinone. For example, quinhydrone can be oxidized with aqueous $NaClO_3$ to form quinone, or reduced in an aqueous iron slurry to form hydroquinone. Whatever reactions are employed to produce the desired end products, the amount of contaminants remaining from the cell liquors will be neglible, for the reasons explained above. Further, if desired, the quinhydrone can be stored. It is highly stable and may be stored without deterioration. Quinhydrone may also be sold for conversion to quinone or hydroquinone by users.

The quinone recovery principles just described are further illustrated by the flow sheet of FIG. 2. As there shown, the Stream T is supplied from the anode tank (tank 12 in FIG. 1). Since the benzene phase may contain solid impurities, it is passed through a filter at 30. Further, as the benzene may still contain some separable aqueous phase, the benzene is passed to phase separation Tank I, identified by the number 31. Any separated aqueous phase can be returned to the anode tank, as indicated, and the clarified benzene phase further processed. As shown, the benzene containing the recoverable concentration of quinone is transferred by a pump 32 through a heat exchanger 23 to the quinhydrone reactor 35, the volume rate being controlled by a flow meter 34 in pipe line 44. The quinhydrone reactor 35 may be provided with a mixer as indicated at 36.

In the embodiment illustrated in FIG. 2, the water solution of hydroquinone supplied through pipe line 45 to the quinhydrone reactor 35 is preferrably substantially saturated at the temperature at which it is introduced into the reactor. In the phase contacting within the reactor 35, the maximum transfer of quinone to the water solution with resultant precipitation of quinhydrone therefore occurs. As explained above, the residual benzene will therefore contain a very low concentration of quinone. After the contacting is continued within reactor 35 to substantial equilibrium, the 3-phase mixture (aqueous phase, benzene phase, and solid quinhydrone phase) are removed through the outlet line 46 from the reactor. The solid quinhydrone is separated from the liquid phases at 41, by a suitable solids removing apparatus, such as a centrifuge or filter. The product is solid quinhydrone, which, as indicated, may be used for production of hydroquinone or quinone, or may be stored.

The procedures relating to the purification of the quinhydrone, such as water and/or benzene washing, have already been described. As indicated, the soluble impurities will remain largely in solution. From the separation operation at 41, the liquid phases may be transferred to phase separation Tank II, identified by the number 42. The separated benzene phase may be removed through a line 47, and partially returned to the anode tank for indirect recycle, or supplied directly to Stream B for direct recycle, as explained in connection with the flow sheet of FIG. 1.

The water phase from Tank II, comprising the spent solution of hydroquinone, is transferred by means of a pump 43 and a connecting pipe line to a hydroquinone dissolving tank, identified by the number 37. In this tank, as indicated, additional hydroquinone is added to increase the concentration of the solution to any desired concentration up to full saturation (at the temperature of the water in the tank 37). It will be understood that tank 37 will be provided with a mixer to facilitate the dissolving of the solid hydroquinone.

The concentrated water solution of hydroquinone is transferred by means of a pump 38 to the quinhydrone reactor 35. To assure that any undissolved hydroquinone is removed, and that the hydroquinone solution is otherwise solids-free, the solution may be passed through filter 39, and by means of a valve-controlled pipe line through a flow meter 40 connecting to the reactor inlet line 45. By adjusting flow meter 40 in relation to flow meter 34, the relative volumes of the hydroquinone water solution and the quinone-containing benzene can be proportioned. It will be appreciated that the quinone reactor may be operated on a batch basis, or that the contacting operation may be performed continuously, as indicated.

Instead of solid hydroquinone, an aqueous solution of hydroquinone may be added to tank 37 to provide the make-up hydroquinone. Such solutions of hydroquinone may be produced, for example, by passing a solution of quinone through the cathode compartments of electrolysis cells, such as the cell 10 illustrated in FIG. 1. In addition to cathode produced solutions of hydroquinone, as a source of make-up hydroqu ne for tank 37, solid hydroquinone can be added to ..icrease the hydroquinone concentration, or the system can be operated with water solutions of lower hydroquinone concentration. Another alternate source is the conversion of part of the produced quinhydrone to hydroquinone for use in tank 37.

In embodiments where it is desired to introduce the hydroquinone solution to reactor 35 at as high a concentration as possible, approaching a saturation concentration, it may be desirable to take special precautions to minimize precipitation of hydroquinone between tank 37 and reactor 35. For example, where the temperature of the hydroquinone solution in tank 37 is above the ambient atmospheric temperature and a substantially 100% saturated solution is prepared, the solution may tend to cool as it is transferred to reactor 35, and some precipitation of hydroquinone may occur. This can be avoided either by forming a slightly less than saturated solution in tank 37, or by utilizing a temperature in tank 37 which is slightly below the ambient atmospheric temperature. The solution transferred from tank 37 to reactor 35 will thereby gradully increase in temperature, avoiding an over-saturation condition.

In one preferred mode of operation, the quinhydrone reactor is maintained at a temperature several degrees (viz. 2°–5°C) below the ambient atmospheric temperature. With this temperature control, the water solution of hydroquinone introduced to the reactor through line 45 can be higher than the temperature at which the liquid is discharged through line 46 from the reactor. The spent water solution of hydroquinone removed from tank 42 will therefore still be somewhat below the ambient atmospheric temperature, and will be transferred to the hydroquinone dissolving tank 37 at a temperature below the ambient atmospheric temperature. A substantially 100% saturation in tank 37 may thereby be achieved without leading to the precipitation of hydroquinone or quinhydrone during the transfer of the solution to the quinhydrone reactor. In other words, the solution temperature will continue to gradually increase in transit from tank 37 to reactor 35.

The recovery and recycle process of this invention is further illustrated by the following specific examples.

EXAMPLE I

A continuous recycle process for the production of quinone and its recovery as quinhydrone is operated in a manner similar to the flow sheets of FIGS. 1 and 2. The cell current density is set at 13.5 amps/dm$^2$, and maintained within the range of 13-14 amps/dm$^2$. The heat exchangers in the anolyte and catholyte circuits are operated to maintain an anolyte exit temperature from the cell converter of about 30°C. The phase ratio in the anolyte to the converter is 1 part by volume of the benzene phase to 4 parts by volume of the aqueous electrolyte phase. The aqueous electrolyte phase of both tne anolyte and catholyte is 10 percent by weight sulfuric acid, that is, 10 parts by weight of sulfuric acid per 100 parts of the aqueous electrolyte solution. The pump rates in the anolyte circuit are set to give an anolyte flow rate through the converter in terms of linear velocity of 0.6 feet per second. The concentration of quinone in the benzene phase of the anolyte as supplied to the cell is in the range of 0.6 to 0.7 grams quinone per liter of benzene. As discharged from the cell, the concentration is 3 to 5 grams quinone per liter of benzene. The entire benzene phase as produced by the cell (after separation of the aqueous, gas, and solid phases therefrom) is subjected to a quinone removal operation, wherein the quinone loaded benzene is contacted with a substantially saturated (55 g/l) aqueous solution of hydroquinone at a temperature of 17°-19°C. to form a quinhydrone precipitate. The precipitate is separated from the supernatant liquids by filtration and water-washed. The benzene and water phases are separated. The resulting benzene, is recycled to the process. (In the flow sheet of FIG. 1, the valves 21 and 51 would be closed, and the valves 20 and 49 would be open.) As the benzene is used up, fresh or makeup benzene is added to the recycled aqueous electrolyte. The anode effluent gas is composed predominantly of carbon oxidation products with only a minor amount of oxygen. A typical anode effluent gas composition is: 80 percent $CO_2$, 10% CO, and 10% (or less) $O_2$.

EXAMPLE II

The continuous recycle process is operated as in Example I, exccept that the cationic permselective diaphragms are removed from the electrolysis cells, and replaced with porous diaphragms; namely, woven Dynel filter cloth, Style 182-003-000, produced by the National Filter Media Corporation of New Haven, Connecticut. The catholyte circuit is then operated with a filter incorporated in the recycle line, so that the recycled aqueous electrolyte phase is free from solids.

EXAMPLE III

Following the procedure of either Example I or II, the continuous recycle process is operated using aqueous phosphoric acid as the electrolyte in the anode circuit. The desirable concentration range is 10 percent to 60 percent by weight phosphoric acid, with 30 percent by weight being particularly suitable.

EXAMPLE IV

In the operation of a quinone recovery process in a manner similar to that of the flow sheet of FIG. 2, the conditions in the quinhydrone reactor can be varied as to temperature and concentration of the aqueous hydroquinone solution. Illustrative variations in these conditions are summarized below in Table A.

TABLE A

| | Quinhydrone Reactor Operating Conditions | | |
|---|---|---|---|
| Conditions Nos. | 1 | 2 | 3 |
| Contact Temperatures | 10°C | 18°C | 30°C |
| Initial Q Conc. | 5 g/l | 5 g/l | 5 g/l |
| Initial H$_2$Q Conc. | 32 g/l | 55 g/l | 80 g/l |
| Approx. H$_2$Q Sat. | 80% | 100% | 100% |
| Final H$_2$Q Conc. | 29.9 g/l | 52.1 g/l | 75.9 g/l |
| Final Q Conc. | 0.61 g/l | 0.69 g/l | 1.19 g/l |

Q = quinone
H$_2$Q = hydroquinone

As will be noted, the foregoing sets of conditions were determined assuming an initial concentration of quinone in the benzene of 5 g/l. The variables, therefore, were the contact temperatures in the reactor, and the initial hydroquinone concentration in the aqueous phase.

It may be assumed that the temperature of the water solutions of hydroquinone as introduced to the reactor are substantially the contact temperatures, and, similarly, that the benzene in each case is introduced to the reactor at approximately the same temperature. The indicated approximate initial hydroquinone saturation is on this basis. The final hydroquinone concentrations refer to the concentrations in the aqueous phase, while the final quinone concentrations refer to the residual concentrations in the benzene, which would constitute the recycle concentrations.

The foregoing data indicates that under operating conditions No. 1 approximately 4.3 to 4.5 grams quinone per liter of benzene can be recovered, as precipitated quinhydrone. Similarly, under conditions Nos. 2 and 3, respectively, approximately 4.2 to 4.4 and 3.7 to 3.9 g/l would be recoverable. In starting up, a small amount of quinone and quinhydrone will dissolve in the aqueous phase, but with recycle of the aqueous phase, the water solution of hydroquinone can be utilized at approximately saturation values for the quinone and quinhydrone, thereby minimizing such process losses in the quinhydrone reactor.

We claim:

1. A separation and recycle process for use with electrolysis apparatus converting benzene to quinone in anode compartments thereof, said apparatus continuously producing a dilute solution of quinone in benzene containing substantially in excess of 1 gram quinone per liter, comprising intermixing and contacting portions of said product solution with a water solution of hydroquinone containing at least 15 grams per liter of hydroquinone, said contacting being carried out with said solutions at temperatures of from 10 to 25° C., said contacting removing dissolved quinone from said product solution by reaction with said hydroquinone to form quinhydrone precipitate, said contacting being continued with formation of said quinhydrone until the resulting benzene contains less than one gram per liter of dissolved quinone, separating said resulting benzene from the remaining hydroquinone water solution and said quinhydrone precipitate, and recycling said separated benzene to said electrolysis apparatus, whereby recycled benzene is supplied to said apparatus of sufficiently low quinone content to maintain a more efficient anodic oxidation of benzene to quinone.

2. The process of claim 1 in which the concentration of dissolved quinone in said product solution is not over 5 grams per liter.

3. The process of claim 1 in which said water solution of hydroquinone when first contacted with said product solution is substantially saturated with said hydroquinone.

4. The process of claim 3 in which said contacting is carried out at a temperature from 2° to 5°C. below the ambient atmospheric temperature to avoid precipitation of hydroquinone from said substantially saturated water solution thereof.

5. A separation and recycle process for use with electrolysis apparatus converting benzene to quinone in anode compartments thereof, said apparatus continuously producing a dilute solution of quinone in benzene containing dissolved quinone within the range from 1 to 5 grams per liter, comprising intermixing and contacting portions of said product solution with a water solution of hydroquinone containing at least 15 grams per liter of hydroquinone, said contacting being carried out with said solutions at temperatures of substantially 15 to 20°C., said contacting removing dissolved quinone from said product solution by reaction with said hydroquinone to form quinhydrone precipitate, said contacting being continued with formation of said quinhydrone until the resulting benzene contains from 0.3 to 0.9 grams per liter of dissolved quinone, separating said resulting benzene from the remaining hydroquinone water solution and said quinhydrone precipitate, and recycling said separated benzene to said electrolysis apparatus, whereby recycled benzene is supplied to said apparatus of sufficiently low quinone content to maintain a more efficient anodic oxidation of benzene to quinone.

6. The process of claim 5 in which said product solution contains from 3 to 5 grams per liter of dissolved quinone, said contacting is carried out at a temperature of about 17° to 19°C., and said water solution of hydroquinone when initially contacted with said portions of said product solution is substantially saturated with said hydroquinone.

7. The process of claim 6 in which said contacting is carried out at a temperature from 2° to 5°C. below the ambient atmospheric temperature to avoid precipitation of hydroquinone from said substantially saturated water solution thereof.

* * * * *